Figures 1, 2:
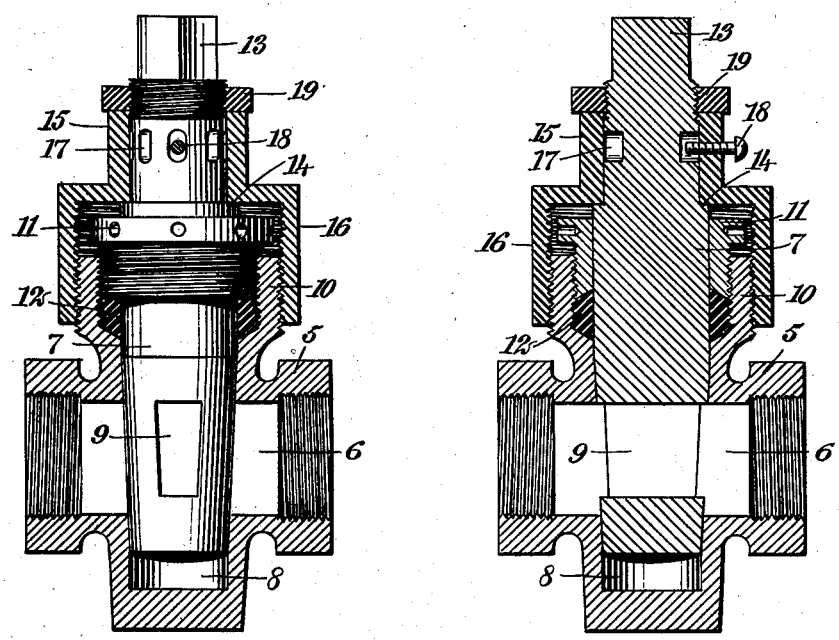

J. G. PATERSON.
PLUG COCK.
APPLICATION FILED DEC. 24, 1908.

924,270.

Patented June 8, 1909.

WITNESSES

INVENTOR
John Gibb Paterson
BY
ATTORNEYS

UNITED STATES PATENT OFFICE.

JOHN GIBB PATERSON, OF LOS ANGELES, CALIFORNIA, ASSIGNOR OF ONE-HALF TO BENJAMIN F. HULSE, OF LOS ANGELES, CALIFORNIA.

PLUG-COCK.

No. 924,270.  Specification of Letters Patent.  Patented June 8, 1909.

Application filed December 24, 1908. Serial No. 469,064.

*To all whom it may concern:*

Be it known that I, JOHN GIBB PATERSON, a citizen of the United States, and a resident of Los Angeles, in the county of Los Angeles and State of California, have invented a new and Improved Plug-Cock, of which the following is a full, clear, and exact description.

The invention is an improvement in plug cocks, and has in view means to withdraw the plug from its seat in opening the cock, thus avoiding friction and consequent cutting and abrasion of the plug and its seat. When the cock is closed, the plug is forced to its seat tighter than would otherwise be practical in the conventional plug cock.

Reference is to be had to the accompanying drawings forming a part of this specification, in which similar characters of reference indicate corresponding parts in both views.

Figure 1 is a central longitudinal section of a plug cock embodying my invention and showing the plug closed; and Fig. 2 is a similar sectional view showing the cock open.

In the construction of my improved plug cock, a casing 5 of the usual form is employed, which is shown to have a passage 6 therethrough and internally threaded at each end for pipe connections, also having a conical seat intersecting the passage for receiving the conical or tapering end of a plug 7, the lower end of the latter passing into the usual socket 8 of the casing, and at a point thereabove provided with the customary transverse opening 9, which is movable into register or alinement with the passage 6 of the casing when the cock is opened. The upper or outer portion of the plug 7 passes through a stuffing-box 10, where it is of uniform cross-section and movable in a packing gland 11, the latter being threaded within the stuffing-box and forming a fluid-tight connection around the plug by means of the packing 12. The plug at its outer end has the usual wrench-engaging or handle portion 13, and an adjacent reduced portion forming a shoulder 14, on which seats a cap 15 closely fitting the reduced portion of the plug and having an enlarged portion 16, threaded over the stuffing-box 10 of the plug casing. The reduced portion of the plug has a series of recesses 17, in one of which engages a screw 18, threaded through the reduced portion or neck of the cap and connecting the plug and cap together. On the outer portion of the plug a nut 19 is threaded and seats on the outer end of the cap, binding the same to the shoulder 14. The recesses 17 in the plug are preferably elongated in order that the screw may freely pass therein when the position of the screw is slightly elevated or depressed. The particular connection between the cap and plug, obviously enables them to be so adjusted relatively that the plug will be forced tight to its seat when the opening 9 therein is turned at right-angles to the passage 6. In opening the cock, the cap unthreads from the cock casing and withdraws the plug from its seat, thus avoiding friction between these parts and the cutting of the metal incident thereto. In closing the cock, the plug can be forced to its seat tighter than would be practical if the plug remained seated in both of its positions, as in the customary plug cock construction.

Having thus described my invention, I claim as new and desire to secure by Letters Patent:

1. A plug cock having means for withdrawing the plug from its seat in opening the cock, and means for adjusting said means circumferentially on the plug.

2. The combination of a cock casing having a passage therethrough, a plug having a conical portion seating in the casing and intersecting said passage and provided with an opening, a stuffing-box surrounding the body of the plug, and a cap adjustably connected with the plug and threaded over the stuffing-box, to withdraw the plug from its seat in turning the opening therein into alinement with the passage in the casing.

In testimony whereof I have signed my name to this specification in the presence of two subscribing witnesses.

JOHN GIBB PATERSON.

Witnesses:
ANDREW SCHOLZ,
W. P. MCARTHUR.